United States Patent
Watanabe et al.

(10) Patent No.: US 7,311,277 B2
(45) Date of Patent: Dec. 25, 2007

(54) SHREDDER APPARATUS AND SHREDDING METHOD

(75) Inventors: Ryoji Watanabe, Kanagawa (JP);
Akihiko Takada, Kanagawa (JP);
Masayoshi Sakakibara, Kanagawa (JP); Hajime Kishimoto, Kanagawa (JP); Yasuo Horino, Tokyo (JP);
Toshiyuki Yano, Kanagawa (JP);
Yasuhiro Matsuo, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 0 days.

(21) Appl. No.: 10/647,235

(22) Filed: Aug. 26, 2003

(65) Prior Publication Data

US 2004/0069883 A1 Apr. 15, 2004

(30) Foreign Application Priority Data

Aug. 28, 2002 (JP) ............................. 2002-248789
Jun. 13, 2003 (JP) ............................. 2003-169622

(51) Int. Cl.
*B02B 5/02* (2006.01)
*B02C 1/10* (2006.01)
*B02C 9/04* (2006.01)
*B02C 19/10* (2006.01)
*B03B 7/00* (2006.01)

(52) U.S. Cl. ................ 241/101.2; 241/101.3; 241/235; 241/236

(58) Field of Classification Search ........... 241/101.2, 241/101.3, 235, 236
See application file for complete search history.

(56) References Cited

U.S. PATENT DOCUMENTS

| | | | | |
|---|---|---|---|---|
| 4,192,467 A | * | 3/1980 | Hatanaka | 241/34 |
| 4,879,724 A | * | 11/1989 | Matsumoto et al. | 372/46.01 |
| 4,931,770 A | * | 6/1990 | Abramson | 340/541 |
| 6,038,012 A | * | 3/2000 | Bley | 355/40 |
| 6,100,804 A | * | 8/2000 | Brady et al. | 340/572.7 |
| D443,230 S | * | 6/2001 | DaRosa | D11/157 |
| 6,550,701 B1 | * | 4/2003 | Chang | 241/36 |
| 6,676,050 B2 | * | 1/2004 | Chang | 241/37.5 |
| 6,758,392 B2 | * | 7/2004 | Bennett et al. | 235/375 |
| 2003/0234249 A1 | * | 12/2003 | Wang et al. | 219/679 |
| 2004/0104289 A1 | * | 6/2004 | Schwelling | 241/236 |

FOREIGN PATENT DOCUMENTS

| | | |
|---|---|---|
| JP | A 2000-285203 | 10/2000 |
| JP | A 2001-134672 | 5/2001 |
| JP | A 2001-148000 | 5/2001 |
| JP | A 2001-229199 | 8/2001 |
| JP | A 2001-260580 | 9/2001 |
| JP | A 2001-283011 | 10/2001 |

OTHER PUBLICATIONS http://pcweb.mycom.co.jp/news/2001/07/05/22.html.

* cited by examiner

*Primary Examiner*—Bena Miller
(74) *Attorney, Agent, or Firm*—Oliff & Berridge, PLC

(57) ABSTRACT

When a printing paper to which an IC chip storing secret information is attached is discarded, a shredder applied voltage to the IC chip by a discharging unit to destroy the IC chip and to make it impossible to read the secret information therefrom. Thereafter, a shredding cutter shreds the printing paper and the shred printing paper is discarded.

14 Claims, 6 Drawing Sheets

SHREDDER APPARATUS AND SHREDDING METHOD

The present disclosure relates to the subject matter contained in Japanese Patent Application No.2002-248789 filed on Aug. 28, 2002 and Japanese Patent Application No.2003-169622 filed on Jun. 13, 2003, which are incorporated herein by reference in its entirety.

BACKGROUND OF THE INVENTION

1. Field of the Invention

The present invention relates to a shredding apparatus and a shredding method, which perform a shredding process with respect to an image display member to which a non-contact memory has been attached.

2. Description of the Related Art

A compact semiconductor chip (for example, u-chip by HITACHI, LTD.) from which an external unit can read stored data in a non-contact manner has been known.

Also, JP-A-2001-229199, JP-A-2000-285203, JP-A-2001-134672, JP-A-2001-283011, JP-A-2001-148000, and JP-A-2001-260580 disclose applications of the compact semiconductor chip.

The invention has been made based on the above-described technical background. An object of the invention is to provide a shredding apparatus and a shredding method, which destroy data stored in a data storage device so that the data cannot be read therefrom when an image display member to which the data storage device such as a semiconductor chip is discarded.

SUMMARY OF THE INVENTION

[Shredding Apparatus]

To achieve the above described object, according to a first aspect of the invention, a shredding apparatus includes a destroy process unit for destroying data stored in an image display member, and a shredding process unit for shredding the image display member.

Preferably, the shredding process unit shreds the image display member to make an image displayed on the image display member be invisible.

Preferably, the data is stored in a data storage device of the image display member.

Preferably, the destroy process unit applies one of electric field and magnetic field to a data storage unit of the image display member to destroy the data.

Preferably, the destroy process unit destroys the data storage device physically.

Preferably, the shredding apparatus further includes an insertion port from which the image display member is inserted into the shredding apparatus. The destroy process unit is disposed closer to the insertion port than the shredding process unit.

Preferably, the shredding process unit shreds the image display member after applying the at least one of the electric field and the magnetic field to the data storage device.

Preferably, the destroy process unit applies voltage to the data storage device to destroy the data storage device and the data.

Preferably, the data destroy unit applies an electromagnetic wave to the data storage device to overwrite another data into the data storage device so that the data stored in the data storage device is destroyed.

Preferably, the shredding apparatus further includes a sensing unit for sensing as to whether the image display unit includes a data storage device storing the data, and a control unit for controlling the destroy process unit to destroy the data when the sensing unit senses that the image display unit includes the data storage device.

Preferably, the shredding apparatus further includes a display member sensing unit for sensing presence of the image display member and a control unit for controlling at least one of the destroy process unit and the shredding process unit to perform each operation when the display member sensing unit senses the image display member.

Preferably, the shredding process unit shreds the image display member so that the displayed image cannot be recognized.

[Shredding Method]

Also, according to a second aspect of the invention, a shredding method includes destroying data stored in an image display member, and shredding the image display member.

DETAILED DESCRIPTION OF THE PREFERRED EMBODIMENT

Embodiment

An embodiment of a shredding method according to the invention will now be described with reference to a specific example.

Figure 1:
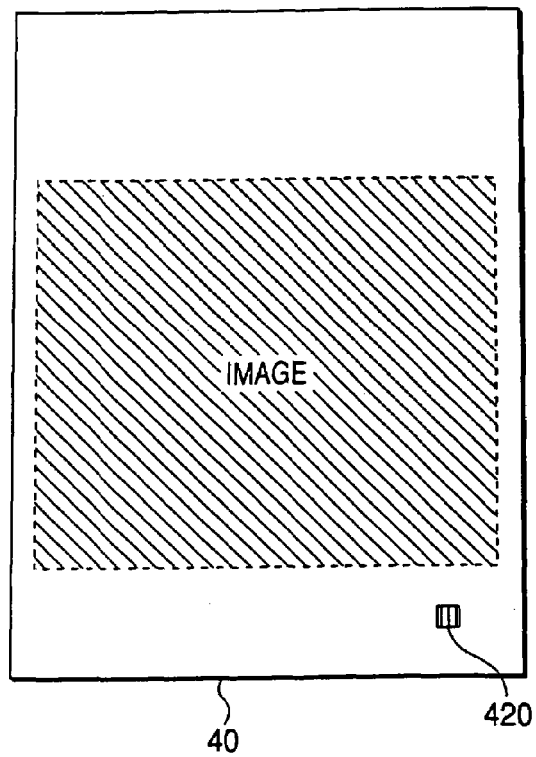
FIG. 1 is a diagram for exemplifying a printing paper (image display member) which is processed in a postprocessing method according to the present invention.

FIG. 1 is a diagram for showing a printing paper 40 (image display member), which is processed by the shredding method according to the invention.

As shown in FIG. 1, an image has been printed on the printing paper 40.

An image, which has been printed on the printing paper 40, corresponds to, for instance, secret information (confidential information). After this secret information image is viewed, this image is desirably postprocessed so that the secret information cannot be visibly recognized.

Also, an IC chip 420 (data storage device) is attached to the printing paper 40.

The IC chip 420 attached to the printing paper 40 corresponds to a semiconductor chip from which data stored thereinto can be read in a non-contact manner. For instance, information having higher secrecy than the secret information printed on a surface of the printing paper 40 may be stored in the IC chip 420.

Preferably, after information stored in the IC chip 420 is viewed, this information is also processed so that this information cannot be read form the IC chip 420.

It should be noted that the IC chip 420 may be a ROM or a RAM.

[Shredder 2]

Figure 2:
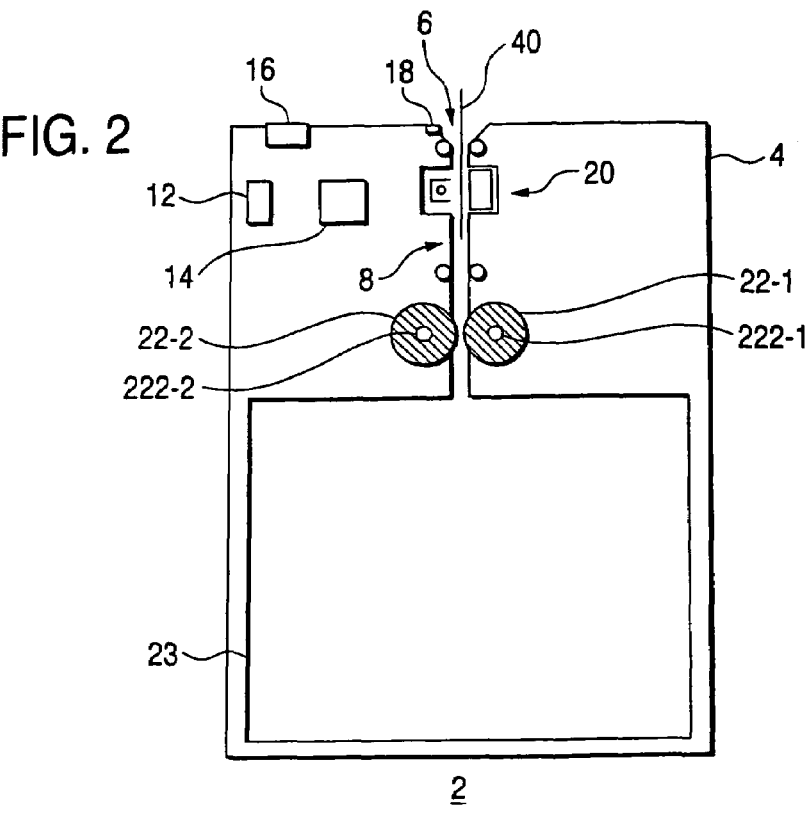
FIG. 2 is a diagram for exemplifying a hardware structure of a shredder 2 (shredder apparatus) to which the postprocessing method according to the present invention is applied.

FIG. 2 is a diagram for showing an example of a hardware structure of a shredder 2 (shredding apparatus) to which the shredding method according to the invention is applied.

As shown in FIG. 2, the shredder 2 includes a control apparatus 12 (control unit), a power supply apparatus 14, a user interface apparatus 16 (UI apparatus), an insertion port sensor 18 (display medium detecting unit), a discharge unit 20 (destroying process unit), a shredding cutter 22 (shredding process unit), and a storage unit 23. The control apparatus 12 controls an operation of each constituent component of the shredder 2. The power supply apparatus 14 supplies electric power to each constituent component of the shredder 2. The user interface apparatus 16 contains either an LCD display device or a CRT display device, and a keyboard/touch panel etc. The discharge unit 20 applies voltage to the IC chip 420. The shredding cutter 22 shreds the printing paper 40. The storage unit 23 stores thereinto shredded printing paper 40.

Also, an insertion port 6 used to insert the printing paper 40 thereinto is formed in an upper surface 4 of a housing of the shredder 2. A transport path 8 is formed inside the housing of the shredder 2. This transport path 8 transports the printing paper 40 inserted from the insertion port 6.

This transport path 8 transports the printing paper 40, which is shredded by the shredding cutter 22 (the shredded printing paper 40 will be referred to as "scraps" hereinafter) to the storage unit 23.

The UI apparatus 16 is arranged on the upper surface 4 of the housing of the shredder 2, and displays status of the shredder 2 (under shredding operation, or full scraps etc.).

The insertion port sensor 18 corresponds to, for example, an optical sensor for sensing as to whether or not the printing paper 40 is present. This insertion port sensor 18 is arranged in the vicinity of the insertion port 6 to sense the printing paper 40 inserted into this insertion port 6.

The discharge unit 20 is arranged in the vicinity of the transport path 8 in order to apply a high voltage to the printing paper 40.

A shredding cutter 22-1 and another shredding cutter 22-2 are cutting blades, side surfaces of which are made in contact with each other, and are arranged in the transport path 8.

The shredding cutter 22-1 has a rotation shaft 222-1, and the shredding cutter 22-2 has another rotation shaft 222-2. While both the shredding cutter 22-1 and the shredding cutter 22-2 receive drive force of a motor (not shown), these shredding rollers 22-1 and 22-2 are rotated in a direction along which the printing paper 40 is drawn to the storage unit 23 to shred the printing paper 4, which is transported via the transport path 8 (shredding process).

The shredding cutter 22-1 and the shredding cutter 22-1 preferably may shred the printing paper 40 finely so that the image printed on the printing paper 40 cannot be visibly recognized.

The storage unit 23 stores therein scraps shredded by the shredding cutter 22.

The storage unit 23 has a take-out port (not shown) through which scraps are taken out. The scraps stored in this storage unit 23 are taken out and discarded.

[Discharge Unit 20]

Figure 3:
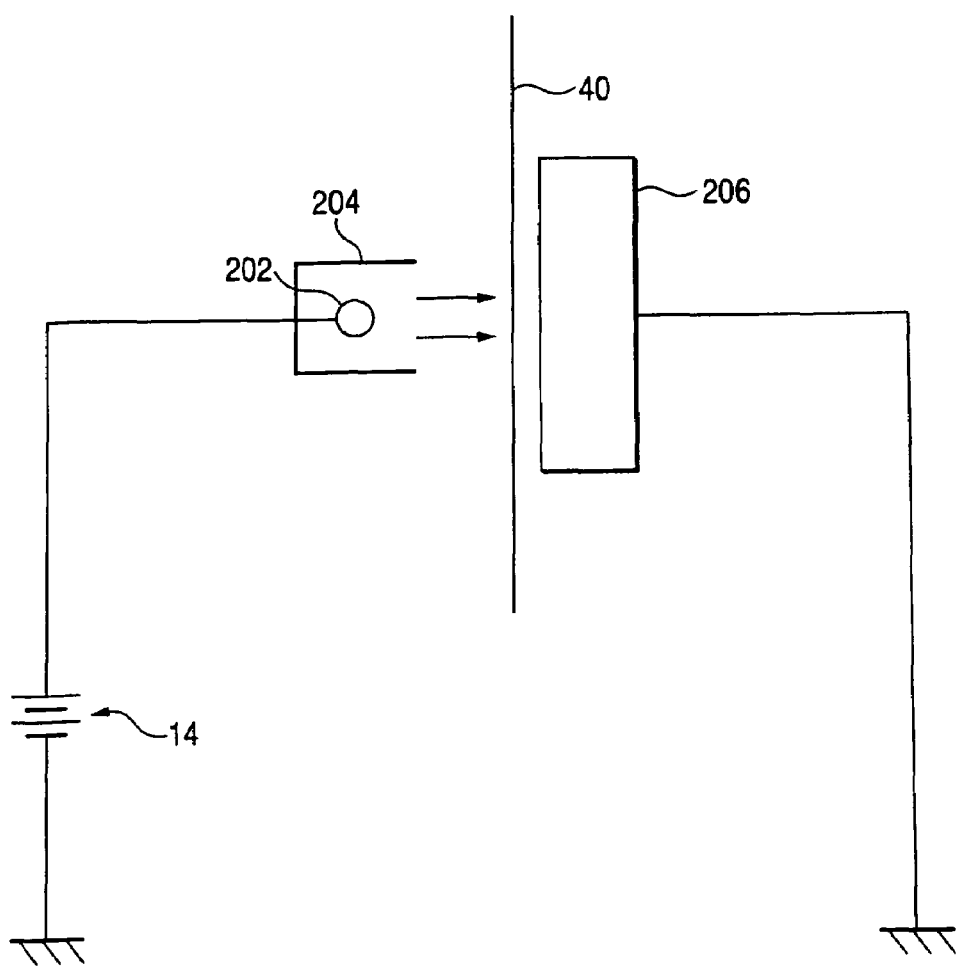
FIG. 3 is an explanatory diagram for explaining an outline of a discharge unit shown in FIG. 2.

FIG. 3 is an explanatory diagram for explaining an outline of the discharge unit 20 shown in FIG. 2.

As shown in FIG. 3, the discharge unit 20 includes a discharge wire 202 having an electric conductivity, a shield case 204, a base electrode 206, and the like.

The discharge wire 202 is, for example, a tungsten wire having a very small diameter. This discharge wire 202 generates corona discharge toward the base electrode 206 by utilizing a voltage, which is applied from a power supply apparatus 14.

The shield case 204 corresponds to a metal plate made of aluminum etc., which is formed in such a manner that this shield case 204 surrounds a peripheral portion of the discharge wire 202. This shield case 204 has an opening at a plane opposite to the base electrode 206.

The discharge unit 20 generates corona discharge when the printing paper 40 is located between the discharge wire 202 and the base electrode 206 in order to produce overcurrents in the IC chip 420 attached to the printing paper 40, so that this overcurrent can destroy the IC chip 420 in an electromagnetic manner.

[Overall Operation]

Figure 4:
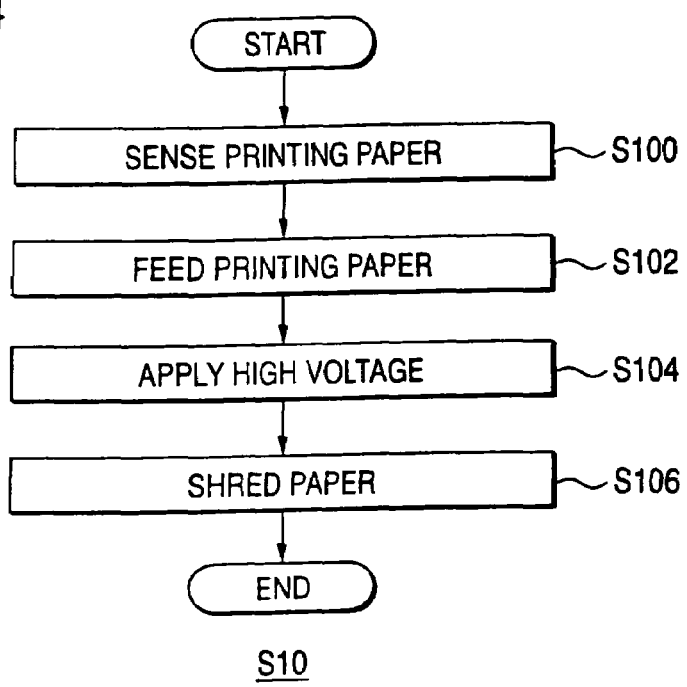
FIG. 4 is a flow chart for describing operations (S10) of the shredder 2 shown in FIG. 2.

FIG. 4 is a flowchart for describing operation (S10) of the shredder 2 shown in FIG. 2.

As indicated in FIG. 4, in a step 100 (S100) of this flow chart, when a user inserts the printing paper 40 (FIG. 1) to be discarded into the insertion port 6 (FIG. 2), the insertion port sensor 18 senses that this printing paper 40 is inserted and then notifies this sensing result to the control apparatus 12.

Upon receipt of this notification, the control apparatus 12 controls each constituent component so as to commence the shredding process of this printing paper 40.

Concretely speaking, when the insertion port sensor 18 senses the printing paper 40, the control apparatus 12 controls the discharge unit 20 to commence the discharging process, and controls the shredding cutter 22 to commence the shredding process.

Also, the power supply apparatus 14 supplies the electric power to the discharge unit 20 in accordance with control of the control apparatus 12.

In a step 102 (S102), the transport path 8 (FIG. 2) transports the inserted printing paper 40 to a position of the discharge unit 20 in response to the control of the control apparatus 12.

In a step 104 (S104), the discharge unit 20 (FIG. 2) applies a high voltage to the transported printing paper 40 to generate corona discharge.

In a step 106 (S106), after the corona discharge process has been carried out, when the transport path 8 transports the printing paper 40 to a position of the shredding cutter 22, the shredding cutter 22-1 and the shredding cutter 22-2 are rotated to shred the printing paper 40.

The shredder 2 transports the shredded printing paper 40 to the storage unit 23, and then accomplishes the shredding process.

As described above, the shredder 2 generates the corona discharge with respect to the printing paper 40 to produce the overcurrent in the IC chip 420 attached to the printing paper 40, so that at least a part of a semiconductor circuit of this IC chip 420 is destroyed. Therefore, the data stored in this IC chip 420 cannot be read therefrom.

Furthermore, the shredder 2 shreds the printing paper 40 in order that the image printed on the printing paper 40 cannot be visibly recognized.

[First Modification]

It should be understood that when the IC chip 420 is a rewritable semiconductor chip, the information, which has been stored in the IC chip 420, may be destroyed by overwriting data (will be referred to as "overwritten data" hereinafter) in this IC chip 420.

Figure 5:
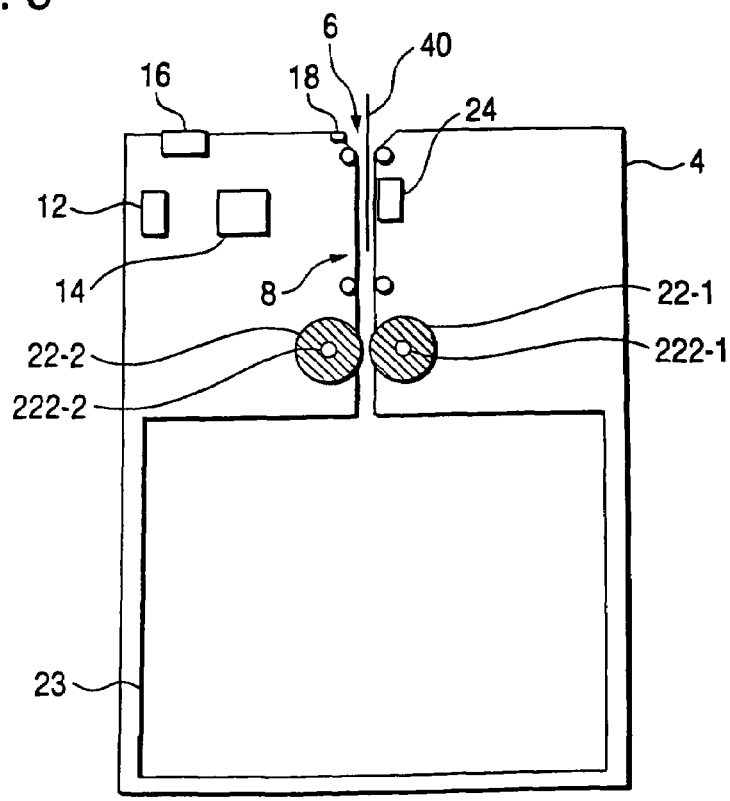
FIG. 5 represents a hardware structure of a second shredder 3.

FIG. 5 schematically shows a hardware structure of a second shredder 3.

As shown in FIG. 5, this second shredder 3 employs a structure in which the discharge unit 20 of the shredder 2 is replaced with an IC chip interface (IC chip IF) 24.

The IC chip IF 24 applies electromagnetic waves to the IC chip 420 to rewrite data stored in this IC chip 420 (this process will be explained later with reference to FIGS. 6 and 7).

It should also be noted that constituent components of the shredder 3, which are substantially same as those of the shredder 2, are allotted the same reference numerals.

[IC Chip 420/IC Chip IF 24]

Figure 6:
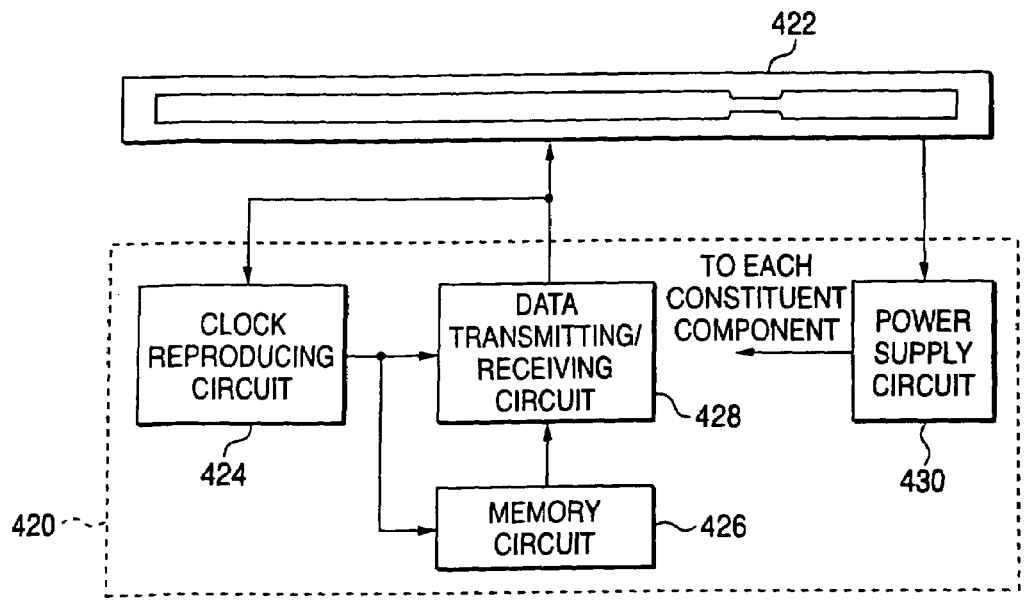
FIG. 6 is a diagram for representing a structure of an IC chip into which data is writable.

FIG. 6 is a diagram for schematically showing a structure of the IC chip 420 into which data is writable.

Figure 7:
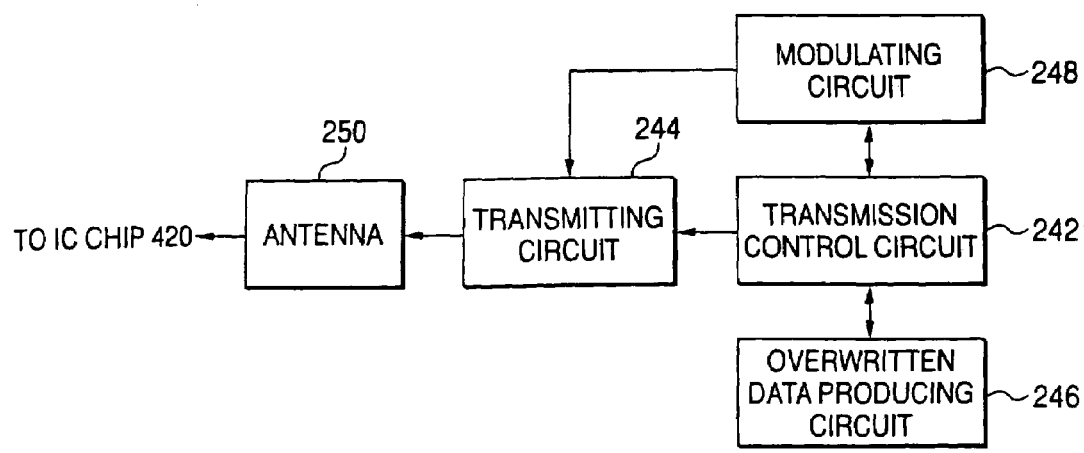
FIG. 7 is a diagram for indicating a structure of an IC chip IF shown in FIG. 5.

FIG. 7 is a diagram for schematically showing a structure of the IC chip IF 24 shown in FIG. 5.

As shown in FIG. 6, the IC chip 420 includes an antenna 422, a clock reproducing circuit 424, a memory circuit 426, a data transmitting/receiving circuit 428, and a power supply circuit 430.

It should also be noted that when it is so guaranteed that the IC chip 420 of the printing paper 40 may pass in the close proximity to the IC chip IF 24, an IC chip 420 having no antenna 422 may be employed.

Also, as shown in FIG. 7, the IC chip IF 24 includes a transmitting circuit 244, a transmission control circuit 242, an overwritten-data producing circuit 246, a modulating circuit 248, and an antenna 250.

The constituent components of the IC chip 420 and the IC chip IF 24 operate as described below. Thereby, the overwritten data is written into the IC chip 420 via the IC chip IF 24, so that the data indicating the secret information stored in the IC chip 420 can be rewritten by the overwritten data.

In the IC chip 420 (see FIG. 6), the power supply circuit 430 rectifies an electromagnetic wave signal supplied via the antenna 422 to supply electric power to each constituent components of the IC chip 420. This electric power is required for the constituent components.

The clock reproducing circuit 424 reproduces a clock signal from the electromagnetic wave signal supplied via the antenna 422 from the IC chip IF 24 and then, outputs the reproduced clock signal to the memory circuit 426 and the data transmitting/receiving circuit 428.

The memory circuit 426 is, for example, a nonvolatile RAM (random access memory). This memory circuit 426 stores the overwritten data, which is input from the data transmitting/receiving circuit 428 in synchronization with the clock signal input from the clock reproducing circuit 424.

The data transmitting/receiving circuit 428 demodulates the electromagnetic wave signal input from the antenna 422 into data and then, outputs this demodulated data to the memory circuit 426 in synchronization with the clock signal input from the clock reproducing circuit 424.

Also, the data transmitting/receiving circuit 428 changes a reflection intensity of the electromagnetic wave signal supplied from an external in accordance with a value of a data input from the memory circuit 426 in synchronization with the clock signal when the IC chip 420 transmits the data to the external.

As described above, the data, which has been stored in the memory circuit 426, can be transmitted from the IC chip 420 to the external by changing the intensity of the reflection signal of the electromagnetic wave signal transmitted from the external to the IC chip 420.

In the IC chip IF 24 (FIG. 7), the transmission/reception control circuit 244 controls an operation of each constituent component of this IC chip IF 24.

Also, this transmission/reception control circuit 244 outputs data input from the overwritten-data producing circuit 246 to the modulating circuit 248.

The modulating circuit 248 modulates a high frequency signal (radio frequency signal) based on the data input from the transmission/reception control circuit 242 to produce an electromagnetic wave signal and then, outputs this produced electromagnetic wave signal to the transmitting circuit 244.

The transmitting circuit 244 transmits the electromagnetic wave signal via the antenna 250 to the IC chip 420. This electromagnetic wave signal contains data to be stored in the IC chip 420, and the clock signal.

The overwritten-data producing circuit 246 produces data, which will be written into the IC chip 420, and then outputs this produced data to the transmission control circuit 242.

For instance, the overwritten-data producing circuit 246 produces data indicating that a data-postprocess has been completed.

Figure 8:
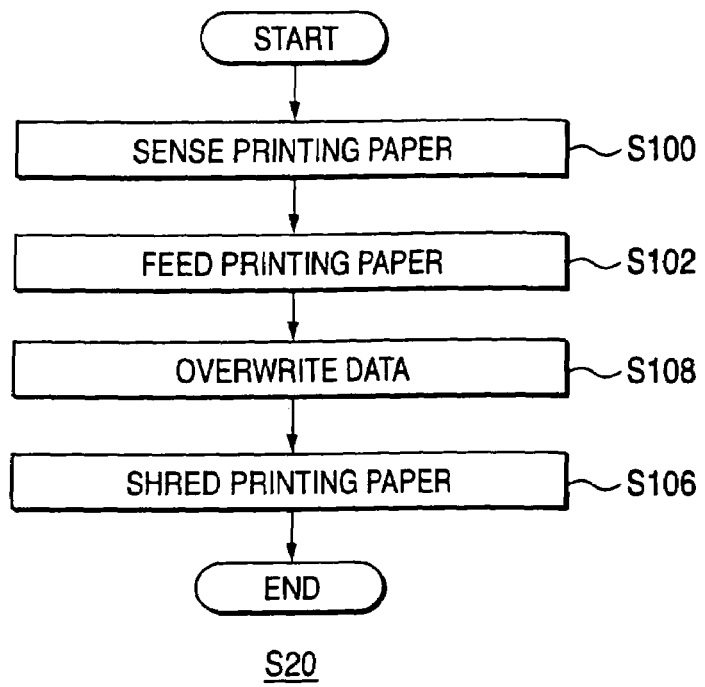
FIG. 8 is a flow chart for describing operations (S20) of the shredder 3 shown in FIG. 5.

FIG. 8 is a flow chart for describing an operation (S20) of the second shredder 3 shown in FIG. 5.

It should also be understood that processes in FIG. 8, which are substantially same as those in FIG. 4, are allotted the same reference numerals.

In the operations of the shredder 3, when the printing paper 40 is transported in the vicinity of the IC chip IF 24 in the process of the step S102, the IC chip IF 24 (FIG. 5) rewrites the data, which has been stored in the IC chip 420 of the printing paper 40, by using the overwritten data.

As described above, the technical idea that the data stored in the IC chip 42 is rewritten by using the overwritten data so that the secret information cannot be read therefore is suitable for a case that the IC chip 420 is extracted from the shredded printing paper 40 so as to be wanted to be reused.

[Second Modification]

Alternatively, the shredder 2 may sense as to whether or not the IC chip 420 has been attached to the printing paper 40, and when the IC chip 420 is attached to the printing paper 40, an operation may be applied to the IC chip 420 so that the data stored in the IC chip 420 cannot be read therefrom.

Figure 9:
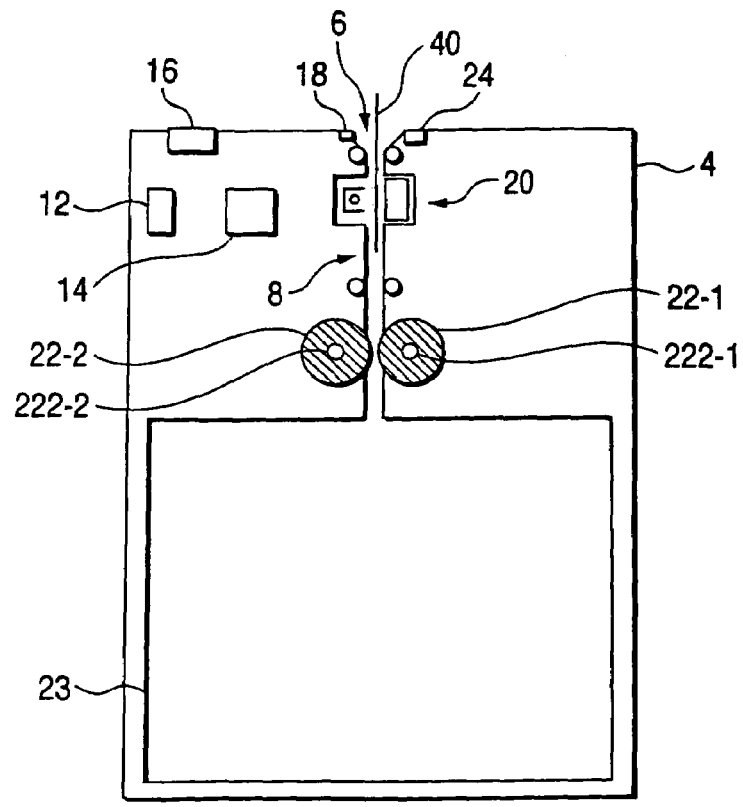
FIG. 9 represents a hardware structure of a third shredder 5.

FIG. 9 is a diagram for indicating a hardware structure of a third shredder 5.

As indicated in FIG. 9, the shredder 5 employs a structure in which an IC chip IF 24 is additionally provided in an upper stream of the discharge unit 20 of the shredder 2.

The IC chip IF 24 is one example of a sensing unit for sensing as to whether or not the IC chip 420 is present. This IC chip IF 24 may sense as to whether or not the IC chip 420 is present by communicating with the IC chip 420.

It should also be noted that constituent components of the shredder 5, which are substantially same as those of the shredder 2, are allotted the same reference numerals.

Figure 10:
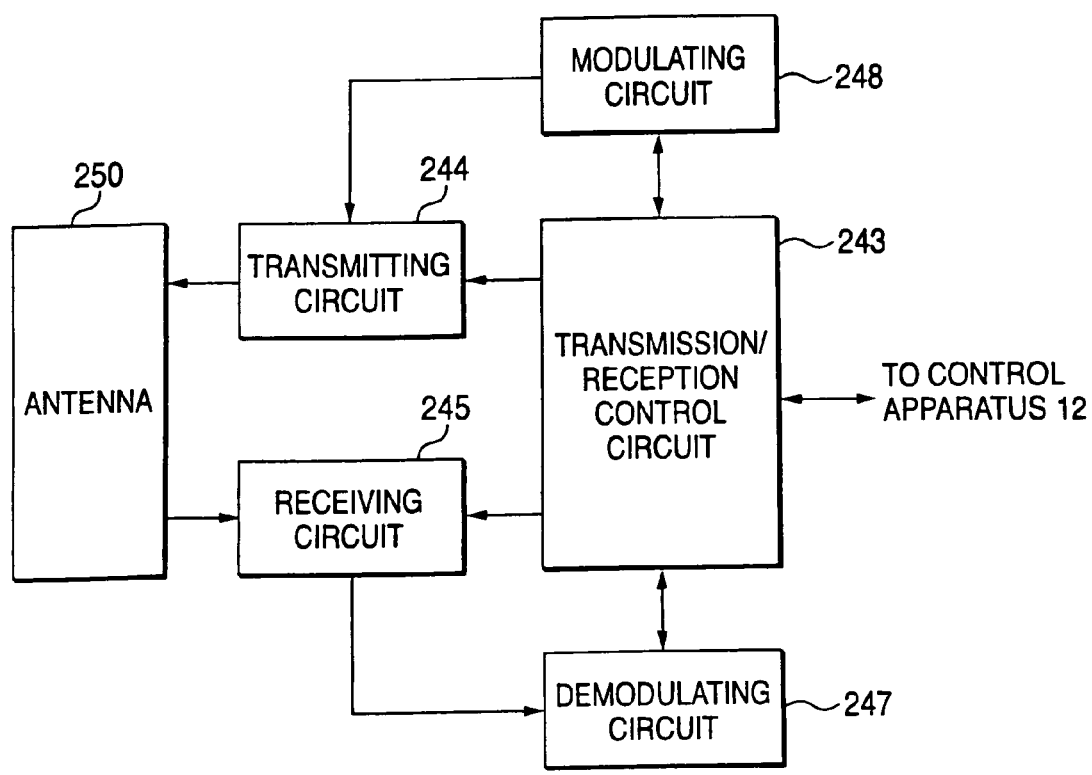
FIG. 10 is a diagram for indicating a structure of an IC chip IF shown in FIG. 9.

FIG. 10 is a diagram for schematically showing an arrangement of the IC chip IF 24 shown in FIG. 9.

As shown in FIG. 10, the IC chip IF 24 includes a transmitting circuit 244, a receiving circuit 245, a transmission/reception control circuit 243, a demodulating circuit 247, and a modulating circuit 248.

It should be understood that the transmitting circuit 244, the modulating circuit 248, and the antenna 250 are substantially identical to those shown in FIG. 7.

The transmission/reception control circuit 243 controls an operation of each constituent component of the IC chip IF 24.

Also, the transmission/reception control circuit 243 outputs to the control apparatus 12 (FIG. 9), data, which has been received by the receiving circuit 245 and then has been demodulated by the demodulating circuit 247. This demodulated data may indicates as to whether or not the IC chip 420 is present, identification information of the IC chip 420, identification information of data contained in the IC chip 420, or the like.

It should also be noted that the control apparatus 12 determines as to whether or not the discharge unit 20 (FIG. 9) is made to operate based on the data input from the transmission/reception control circuit 243 (this data indicates as to whether or not the IC chip 420 is present, identification information of the IC chip 420, identification information of data contained in the IC chip 420, or the like). Then, the control apparatus 12 controls the discharge unit 20.

The transmitting circuit 244 supplies an electromagnetic wave signal containing a clock signal and the like via the antenna 250 to the IC chip 420.

The receiving circuit 245 receives a reflection signal reflected from the IC chip 420, and outputs the received signal to the demodulating circuit 247.

The demodulating circuit 247 demodulates the data transmitted from the IC chip 420 in response to a change of the reflection signal input from the receiving circuit 245 and then, outputs the demodulated data to transmission/reception control circuit 243.

With the above described structure, when the control apparatus 12 receives the notification that the IC chip 420 is sensed from the IC chip IF 24, this control apparatus 12 controls the discharge unit 24 to commence the discharging process. In other cases than the above described case, the control apparatus 12 prohibits the discharge unit 20 from performing the discharging process.

As described above, since the third shredder 5 of this second modification commences the discharge process only when the IC chip 420 is sensed, the control apparatus 12 can prohibit the discharge process with respect to the printing paper to which the IC chip 420 is not been attached to reduce the power consumption.

[Other Modifications]

The shredder 2 (FIG. 2) destroys the IC chip 420 by using the non-contact discharge such as the corona discharge. Alternatively, either an electric conductive brush or an electric conductive roller may be directly contacted to the printing paper 40 to charge this printing paper 40. Thereby, the IC chip 420 attached to the printing paper 40 can be destroyed.

Also, when the data storage device attached to the printing paper 40 is a magnetic recording apparatus, the discharge unit 20 of the shredder 2 shown in FIG. 2 may be replaced with a magnetic field generating unit for generating a high magnetic field. This magnetic field generating unit may expose the magnetic recording device attached to the printing paper 40 to the high magnetic field so as to destroy the data recorded on this magnetic recording apparatus.

shredding cutters are arranged to have a narrow gap therebetween in comparison with the size of the IC chip so that the IC chip is cut (destroyed) physically or mechanically.

In a still another embodiment, rollers made of a comparatively hard material may be added to the shredding apparatus. The rollers may be arranged to contact with each other. With this configuration, when a printing paper to which the IC chip is attached passes through between the rollers, a pressure by the rollers can destroy the IC chip physically (mechanically). As described above, in accordance with the shredder apparatus and the shredding method according to the invention, when the image display member to which the data storage device is attached is discarded, the data stored in this data storage device can be destroyed.

What is claimed is:

1. A shredding apparatus comprising:
    a transport path that transports an image display member including paper through the shredding apparatus;
    a sensing unit that senses as to whether the paper entering into the shredding apparatus has an electronic data storage device attached thereto;
    a data destroy process unit, provided along the transport path, that destroys electronic data stored in the electronic data storage device as the paper passes thereby along the transport path;
    a control unit that controls the data destroy process unit to destroy the electronic data stored in the electronic data storage device of entered paper if the sensing unit senses that the entered paper has the electronic data storage device attached thereto; and
    a shredding process unit, provided along the same transport path, that shreds the entered paper.

2. The shredding apparatus according to claim 1, wherein the shredding process unit shreds the paper to make an image displayed on the image display member visibly unrecognizable.

3. The shredding apparatus according to claim 1, wherein the data destroy process unit destroys the data in the electronic data storage device by applying at least one of electric field and magnetic field to the electronic data storage device.

4. The shredding apparatus according to claim 3, wherein the shredding process unit shreds the paper after applying the at least one of the electric field and the magnetic field to the electronic data storage device.

5. The shredding apparatus according to claim 3, wherein the data destroy process unit applies voltage to the electronic data storage device to destroy the electronic data storage device and the data.

6. The shredding apparatus according to claim 1, wherein the data destroy process unit destroys the electronic data storage device physically.

7. The shredding apparatus according to claim 1, further comprising:
    an insertion port from which the image display member is inserted into the shredding apparatus, wherein:
    the data destroy process unit is disposed closer to the insertion port than the shredding process unit.

8. The shredding apparatus according to claim 1, wherein the data destroy process unit applies an electromagnetic wave to the electronic data storage device to overwrite another data into the electronic data storage device so that the data stored in the electronic data storage device is destroyed.

9. The shredding apparatus according to claim 1, further comprising:
a display member sensing unit that senses presence of the image display member; and
a control unit for controlling at least one of the data destroy process unit and the shredding process unit to perform each operation when the display member sensing unit senses the image display member.

10. The shredding apparatus according to claim 1, wherein the electronic data storage device comprises a semiconductor device.

11. The shredding apparatus according to claim 10, wherein the semiconductor device comprises an IC chip.

12. The shredding apparatus according to claim 1, wherein the shredding process unit is downstream from the data destroying process unit along the transport path of the shredding apparatus.

13. A shredding apparatus for shredding an image display device having an electronic data storage device attached thereto, comprising:
a transport path that transports the image display device through the shredding apparatus;
a display member sensing unit that senses presence of the image display device;
a sensing unit that senses as to whether the image display device, which is sensed by the display member sensing unit, has the electronic data storage device attached thereto;
a control unit that controls a data destroy process unit to destroy electronic data stored in the electronic data storage device if the sensing unit senses that the entered image display device has the electronic data storage device attached thereto;
a data destroy process unit, provided along the transport path, that destroys the electronic data stored in the electronic data storage device of the image display device passing thereby, by applying at least one of electric field and magnetic field to the electronic data storage device; and
a shredding process unit, provided along the same transport path, that physically shreds the image display device.

14. The shredding apparatus according to claim 13, wherein the shredding process unit is downstream from the data destroying process unit along the transport path of the shredding apparatus.

* * * * *